UNITED STATES PATENT OFFICE 2,154,607

METHOD OF STABILIZING MANGANESE ALLOYS

Ernest F. Doom, Niagara Falls, N. Y., assignor to Electro Metallurgical Company, a corporation of West Virginia No Drawing. Application June 29, 1937,
Serial No. 150,939

3 Claims. (Cl. 148—6)

The invention relates to the treatment of comminuted alloys, and more specifically to a method for imparting to powdered manganese alloys a chemical stability in aqueous alkaline media.

Powdered manganese alloys, ferromanganese for example, are on occasion exposed to the action of aqueous mild alkali. For instance, fluxes for welding frequently contain powdered ferromanganese and alkaline ingredients such as sodium silicate and carbonates of the alkali and alkaline earth metals. The ingredients of the flux are usually made into a paste with water, and the paste is applied to a welding rod on which it is dried to form an adherent film or sheath.

Ordinary powdered ferromanganese reacts slowly with alkaline aqueous media, and the reaction generates gas. In a welding flux mixture, this generation of gas is objectionable because it hinders the production of a smooth, uniform flux coating on a welding rod. The principal object of the present invention is to prevent this undesirable effect.

According to the invention, powdered manganese alloys are made resistant to the action of alkaline media by the formation of a protective film on the surface of the alloy. The protective film is produced by forming a closely adherent oxydic coating on the surface of the powder particles by a relatively superficial reaction of the metal with alkaline media. Preferably, the alloy grains are also coated with a relatively inert substance.

A surface compound may be formed by treating the powdered alloy with aqueous alkali, and accelerating the reaction by the use of a concentrated alkali, or of heat, or both. For instance, in a typical application of the invention, 25 pounds of medium-carbon ferromanganese (containing about 1% carbon, 85% manganese, 1% silicon, remainder iron) powdered to pass a 100 mesh screen (0.15 mm. opening) was mixed with 30 pounds of a 10% aqueous solution of sodium hydroxide, and the mixture heated from 40° C. to boiling during the course of two hours. At the end of two hours, about 20% of the total weight of the alloy had been reacted and the alloy powder was inert towards cold dilute alkali.

It will sometimes be found convenient and effective to grind the alloy in contact with the alkali.

A wide range of alkali concentrations and temperatures may be used, depending upon the particle size of the alloy, the length of the treatment, and the thickness of film or degree of inertness desired. In general, high concentration of alkali, high temperature, and small particle size of the alloy favor the rapid formation of a protective film.

An alternative and preferred procedure is to mix the alloy powder with a solution of sodium silicate. A convenient and especially efficacious method of mixing is to grind the alloy, in a ball mill for instance, with a small proportion of the silicate solution. Surface stabilization of the alloy grains is accomplished by a combined superficial reaction and surface coating of solidified sodium silicate.

In a typical practice of this preferred procedure, 500 pounds of ferromanganese were crushed to pieces one-half inch in diameter and smaller. The crushed alloy was ground in a ball mill with five pounds of ordinary commercial sodium silicate solution until the product all passed a 100 mesh screen. The product was a dry powder which, when mixed with alkaline welding-flux ingredients, formed little or no gas. Only about 1% to 2% of the alloy was reacted during the grinding and reacting with sodium silicate.

Manganese alloys treated according to this invention form few or no visible gas bubbles when used in welding rod fluxes containing the usual alkaline ingredients such as sodium carbonate and sodium silicate. The invention is applicable to all manganese alloys containing more than 35% manganese and carbon in amounts from a trace to about 8%.

I claim:

1. Method of making stable powdered manganese alloy which comprises pulverizing said alloy in admixture with a relatively small proportion of alkaline material to form a superficial oxydic coating on said alloy.

2. Method of making stable powdered ferromanganese alloy which comprises pulverizing said alloy in admixture with a relatively small proportion of sodium silicate solution.

3. Method of making stable, unbonded, powdered manganese alloys which comprises treating such alloys in loose, unbonded condition with an aqueous solution of an alkaline agent chosen from the group consisting of sodium hydroxide and sodium silicate.

ERNEST F. DOOM.